United States Patent
Huang et al.

(10) Patent No.: US 6,438,576 B1
(45) Date of Patent: Aug. 20, 2002

(54) METHOD AND APPARATUS OF A COLLABORATIVE PROXY SYSTEM FOR DISTRIBUTED DEPLOYMENT OF OBJECT RENDERING

(75) Inventors: Yun-Wu Huang; Philip S.-L. Yu, both of Chappaqua; Kun-Lung Wu, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,746

(22) Filed: Mar. 29, 1999

(51) Int. Cl.[7] ................................................ G06F 15/16
(52) U.S. Cl. ..................... 709/202; 709/201; 707/10; 707/104
(58) Field of Search ................. 709/202, 201, 709/303; 707/10, 104

(56) References Cited

U.S. PATENT DOCUMENTS

| | | | |
|---|---|---|---|
| 5,572,643 A | * 11/1996 | Judson | 709/218 |
| 5,673,322 A | * 9/1997 | Pepe et al. | 380/49 |
| 5,742,768 A | * 4/1998 | Gennaro et al. | |
| 5,751,957 A | * 5/1998 | Hiroya et al. | 709/203 |
| 5,793,964 A | * 8/1998 | Rogers et al. | 709/202 |
| 5,826,025 A | * 10/1998 | Gramlich | 709/217 |
| 5,862,481 A | * 1/1999 | Kulkarni et al. | 455/432 |
| 5,918,013 A | * 6/1999 | Mighdoll et al. | 709/217 |
| 6,122,666 A | * 9/2000 | Beurket et al. | 709/226 |
| 6,275,937 B1 | * 8/2001 | Hailpern et al. | 713/188 |

OTHER PUBLICATIONS

"MIME (Multipurpose Internet Mail Extensions) Part One: Mechanisms for Specifying and Describing the Format of Internet Message Bodies," Network Working Group N. Borenstein Request for Comments: 1521 Bellcore, Obsoletes: 1341, Category: Stadards Track, pp. 1–75 (Sep. 1993).

T. Krauskopf, J. Miller, P. Resnick and W. Tresse, "PICS Label Distribution Label Syntax and Communication Protocols," Version 1.1, REC–PICS,labels–961031, W3C Recommendation, pp. 1–31 (Oct. 31, 1996).

C. Evans, C.D.W. Feather, A. Hopmann, M. Presler–Marshall, and Paul Resnick, "PICSRules 1.1," Last Modified Aug. 28, 1997, pp. 1–23.

Group WatchDog Version 1.2, User's Guide, Feb. 16, 1994, Group Wege & Partner EDV–Unternehmensberatung GmbH, Karlsruhe.

Ortega, A. et al., A Framework for Optimization of a Multiresolution Remote Image Retrieval System, IEEE 1994, pp. 672–679.

Wallace, Gregory, "The JPEG Still Picture Compression Standard", IEEE, vol. 38, No. 1, Feb. 1992, 17 pgs.

Fox, Armando et al., "Adapting to Network and Client Variation Using Infrastructural Proxies: Lessons and Perspectives", IEEE, Aug. 1998, pp. 10–19.

* cited by examiner

Primary Examiner—Krisna Lim
(74) Attorney, Agent, or Firm—Gail Zarick, Esq.; Perman & Green, LLP

(57) ABSTRACT

A distributed object rendering method and system for a collaborative data network is disclosed. The data network, which may include the Internet, has attached computing nodes, including object requestor nodes, object source nodes, and intermediate nodes which may be proxy servers. The method can allow each participating proxy server to adapt to the dynamic load conditions of itself as well as proxies, as well as to dynamic traffic conditions in the data network. The determination of which proxy or set of proxies is to perform object rendering and caching is based on a distributed, collaborative method that is adopted among the proxies. The criteria for such a method can include the bandwidth and current load of the network links among proxies, and/or the respective CPU usage of the proxies. If an object rendering can be staged, e.g., different resolution rendering, it can be performed by more than one of the proxies. The determination of which proxy performs which stage of the multistage rendering can also be adaptive to the dynamic load conditions, as well as network conditions.

41 Claims, 5 Drawing Sheets

METHOD AND APPARATUS OF A COLLABORATIVE PROXY SYSTEM FOR DISTRIBUTED DEPLOYMENT OF OBJECT RENDERING

CROSS-REFERENCE TO RELATED PATENT APPLICATIONS

This Patent Application is related to co-pending U.S. patent application Ser. No.: 08/979,748, now U.S. Pat. No. 6,275,937 issued Aug. 14, 2001, filed Nov. 26, 1997, entitled "Collaborative Server Processing of Content and Meta-Information with Application to Virus Checking in a Server Network," by B. Hailpern et al. This Patent Application is also related to co-pending U.S. patent application Ser. No.: 09/027,832, now U.S. Pat. No. 6,122,666 issued Sep. 19, 2000, filed Feb. 23, 1998, entitled "Method for Collaborative Transformation and Caching of Web Objects in a Proxy Network", by J. Beurket et al.

FIELD OF THE INVENTION

This invention relates to data networks and, more particularly, to an ability to perform distributed object rendering on a data network. Specifically, a plurality of collaborative proxy servers perform distributed object rendering so that object contents can be displayed on or consumed by various kinds of client devices, based on their respective device capabilities and specifications.

BACKGROUND OF THE INVENTION

As the Internet becomes ever more popular, more non-personal computer (PC) devices, such as so-called smart phones and PDAs (personal digital assistants), are connected to the Internet, either by wired or wireless connections. The Internet is becoming the so-called pervasive computing environment, where various kinds of information appliances/devices, as well as PCs and other server computers, are all connected. In such a pervasive computing environment it is expected that the individual appliances/devices will have different computing powers and display capabilities. For example, some devices may be capable of displaying color images while others can only display black-and-white images. Also, some devices may have large, easily viewed displays while others may have only a relatively much smaller display. It can thus be appreciated that in such a pervasive computing environment the same information objects may have to be rendered in different forms or resolutions according to different device display specifications. Various techniques have been developed to represent information in various resolutions. In "A Framework for Optimization of a Multiresolution Remote Image Retrieval System" by A. Ortega et al., Proceedings of IEEE InforCom, 1994, a system was disclosed to transmit images and video in multiple resolutions. In "The JPEG Still Picture Compression Standard," by G. Wallace, IEEE Transactions on Consumer Electronics, vol. 38, no. 1, February 1992, the JPEG image compression standard was described to represent images in multiple different resolutions.

The rendering of an object into different forms or resolutions can be performed in different locations. One possible location is within the content servers. However, the content servers may easily become overloaded, especially with a large number of different client requests all coming to the same content servers. Another possible location to render the object is within a client machine which will actually consume the object. However, this is an undesirable solution since many typical client machines tend to be too limited in computing power to perform the necessary rendering function.

Alternatively, the rendering can be done by one or more proxy servers, which are positioned in the data network between the content servers and the client devices. In this scenario the device-specific information can be piggybacked on the meta-information associated with the objects, and the proxy server can perform object rendering according to the meta-information. Once the object rendering is performed by the proxy server the result can be cached (stored) at the proxy server. In this case any subsequent requests for the same object, from the same kind of device, can be served directly from the stored copy in proxy server cache. As a result, the repeated rendering of the object for the same kind of device can be avoided. In order to improve the response time, many PC servers, such as the IBM NETFINITY servers, are being deployed in the Internet as a network of proxy servers (IBM and NETFINITY are both registered trademarks of the International Business Machines Corporation). These proxy servers can work collaboratively in object rendering and caching.

For example, in the above-referenced commonly assigned U.S. Patent Application by B. Hailpern et al., entitled "Collaborative Server Processing of Content and Meta-Information with Application to Virus Checking in a Server Network," a method was disclosed to perform virus checking based on the meta-information on the proxy network by choosing one proxy server. This approach discloses a method to perform certain computations on the object based on the meta-information by one of the proxies in the network. No specific attention was paid to the aspect of caching the objects after the computation. Also, the computation is done completely by the chosen proxy server, and is not done by more than one proxy server in a distributed way.

In the above-referenced commonly assigned U.S. Patent Application by J. Beurket et al., entitled "Method for Collaborative Transformation and Caching of Web Objects in a Proxy Network," a method was proposed to locate one or more specialized proxies to perform the transformation and caching. Once the transformation/rendering is done and cached, all subsequent requests for the desired resolution are served by these specialized transformational proxies. In this approach the caching and rendering of an object is completely done on the same specialized proxies, and the rendering of objects is not readily performed in different stages or collaboratively by more than one different proxies in a distributed way.

In an approach described by A. Fox, entitled "Adapting to Network and Client Variation Using Infrastructural Proxies: Lessons and Perspective," IEEE Personal Communications, pp. 10–19, August 1998, a method was disclosed to perform datatype-specific distillation on a cluster of proxies. Object rendering and caching are all performed by the specific cluster of proxies. A centralized manager is used to perform load balancing among the proxies in the cluster. A drawback of this approach is that object rendering and caching is completely done on the same cluster of proxies, and is not done in a distributed way. Other proxies in the network, but not in the same cluster, cannot participate in some of the stages in the object rendering process.

In view of the foregoing, it can be appreciated that there exists a need for a collaborative proxy system that can deploy object rendering in a distributed fashion. Prior to this invention, this need was not fulfilled.

OBJECTS AND ADVANTAGES OF THE INVENTION

It is a first object and advantage of this invention to provide a collaborative proxy system that performs object rendering in a distributed fashion.

It is another object and advantage of this invention to provide a technique to distribute object rendering processing throughout a proxy network, and to not concentrate the object rendering processing in only specialized object rendering proxies.

It is a further object and advantage of this invention to provide a collaborative proxy network wherein object processing tasks, such as rendering, are distributed in an adaptive fashion based on, for example, dynamic loading characteristics of the proxy network.

SUMMARY OF THE INVENTION

The foregoing and other problems are overcome and the objects and advantages are realized by methods and apparatus in accordance with embodiments of this invention.

In accordance with the teachings of this invention a distributed object rendering method for a collaborative data network is disclosed. The data network, which may include the Internet, has attached computing nodes, including object requestor nodes, object source nodes, and intermediate nodes which may be proxy servers. The method can allow each participating proxy server, which may be referred to simply as a "proxy" and in the plural form as "proxies", to adapt to the dynamic load conditions of itself as well as proxies, as well as to the dynamic traffic conditions in the data network. The determination of which proxy or set of proxies is to perform object rendering and caching is based on a distributed, collaborative method that is adopted among the proxies. The criteria for such a method can include the bandwidth and current load of the network links among proxies, and/or the respective CPU usage of the proxies. If an object rendering can be staged, e.g., different resolution rendering, it can be performed by more than one of the proxies. The determination of which proxy performs which stage of the multistage rendering can also be adaptive to the dynamic load conditions, as well as network conditions.

As a result, a participating proxy, upon serving an object, first determines if object rendering processing is needed based on the client device type. If the object rendering processing is found to be required, then based on the requested object type and the collaborative information about other proxies in the network, the participating proxy can choose to (a) perform the complete object rendering by itself, (b) perform a partial rendering if the rendering process can be staged, or (c) do nothing and let another proxy perform the rendering task. The objective is to distribute the rendering processing throughout the proxy network, not just in the specialized object rendering proxies.

This invention thus provides a distributed, dynamic, hierarchical rendering method in a network comprised of interconnected computing nodes. The method includes steps of, at an object requesting node or at a proxy node coupled to the object requesting node, including with an object request certain meta-information describing the capabilities of the object requesting node (referred to herein as receiver hint information (RHI) or as requestor-specific capability information); at an intermediate node, receiving an object request and forwarding the request to another intermediate node (or to a source of the requested object), if the requested object is not available locally, while modifying the RHI to include information for specifying its local condition for providing the rendering service; otherwise, the intermediate node determines the required rendering, and invokes a selection function to determine, based on the RHI, what part or subset of the required rendering is to be carried out by the intermediate node. The intermediate node then performs the rendering and passes the rendered object to the requesting node. As a part of this invention another intermediate node that receives a partially rendered object invokes a selection function to determine, based on the RHI, what portion (or all) of the remaining required rendering is to be carried out by this intermediate node, and then performs the rendering and passes rendered object to the requesting node.

At an intermediate node having a less detailed version of the requested object the method includes such information in the RHI, forwards the request to another node, and at another intermediate node that has a more detailed version of the requested object, the node decides whether to return the more detailed version of the requested object, without further local rendering, or to instead perform some rendering and return a partially rendered object, or to instead return a completely rendered object.

The local condition information can include the loading and/or capacity of the node (such as CPU utilization), and can be a function of the network delay (from the requesting node). The local condition information can further include a type of rendering that can be performed at the node (which can depend on the software available at the node). The local condition information can further include the storage availability at the local node.

A selection method is provided for each intermediate node to decide dynamically and independently of other nodes what portion of the required rendering to perform locally using the RHI information. The selection method can include steps of (a) dividing a remaining rendering operation into steps; (b) selecting one or more rendering steps to be performed locally in order to optimize a given objective function, using the RHI information as an input parameter; and (c) performing the one or more rendering steps selected for the current node. The objective function can be to perform the rendering steps with the most bandwidth reduction first, and/or to perform the rendering steps so as to reduce load unbalancing among the remaining nodes on the path to the requesting client device node. The objective function can also be an estimated response time from this node to the requesting node, based on the RHI information.

Alternatively, the selection method can includes steps of (a) dividing the remaining rendering operation into steps; (b) assigning, in accordance with an assignment plan, the rendering steps to other nodes on a path to the requesting client device node to optimize the given objective function using the RHI information as the input parameter; and (c) performing the rendering step or steps that are assigned to the current node. It is also within the scope of the teaching of this invention to pass the assignment plan as meta information associated with the rendered object to a next node, which is then free to modify the assignment plan according to local considerations, such as CPU loading at the next node.

The rendered object and/or the received object can be passed to a cache manager for a caching consideration, such as a cost to produce the rendered object.

In general, different intermediate nodes can choose to use different selection functions for rendering, and each intermediate node may choose a different selection function depending upon the local condition of the node (e.g., CPU loading).

Each node may also periodically collect load statistic information from neighboring nodes, instead of including the information in the RHI associated with each request.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
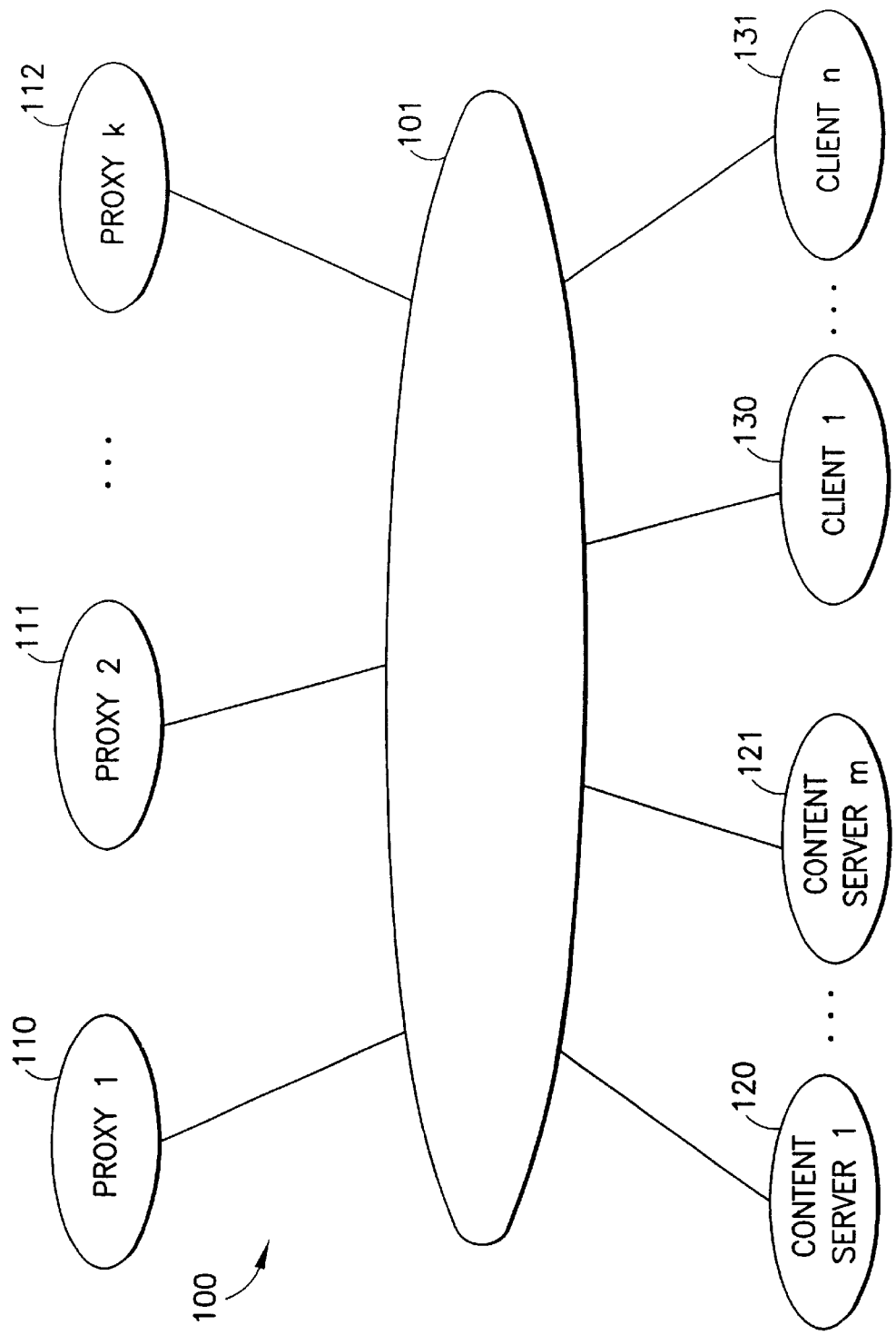
FIG. 1 is a block diagram of an Internet environment in accordance with an exemplary embodiment of the present invention.

FIG. 1 is a block diagram illustrating the overall architecture of a proxy network in accordance with an exemplary embodiment of the present invention. As is shown, various clients 130, 131 may be connected through proxy servers (or proxies) 110, 111, 112 to access information objects in the content servers 120, 121. The clients, proxies and content servers may be all connected through a network 101, such as the Internet. The proxies 110, 111, 112 are generally employed to improve access times, and to provide services such as caching and content filtering. For example, an ISP (Internet Service Provider) may comprise a hierarchical network of proxy servers 110, 111, 112 positioned at various locations (e.g., local, regional and national proxy servers). Alternatively, and also be example, there may be one or more proxy servers that function within a private or semi-private local area network (LAN) or wide area network (WAN), and the one or more proxy servers may be located behind a firewall that provides security for the LAN or WAN.

Object renderings are performed by the proxies 110, 111, 112 based on objects retrieved from the content servers 120, 121. The specific device capabilities, referred to herein as receiver hint information (RHI), as well as the object data type (generally referred to herein as object-specific descriptor information) are included such as by being appended to the meta-information associated with requests and requested objects. The RHI can be included with an object request by the requesting client device 130, 131, or by one of the proxies (e.g., the first proxy coupled to the requesting device.) In the latter case the proxy 110, 111, 112 can access a table of device capabilities, based on an identifier of the requesting device sent with the request, and can construct the RHI based on the stored information in the table. As an example, and assuming an ISP arrangement, the local proxy server has access to a table wherein are stored the characteristics (e.g., type of display, size of graphics memory, etc.) of the various client devices that can be serviced by the local proxy. The table entry for a particular client device 130, 131 can be stored when the device first registers with the ISP. Thereafter, the local proxy server receives an identifier of the client device when the client device makes a request, accesses the table, and constructs the appropriate RHI for inclusion with the object request. In a similar manner the source of the requested object can add the object-specific descriptor information to the returned object, or this information can be added by the proxy server local to the source of the requested object (for the case where a proxy server does not fulfill the request from a copy of the object stored in the proxy, as described in further detail below.)

In a presently preferred embodiment of this invention the RHI is implemented using PICS™ ("Platform for Internet Content Selection") information, and this aspect of the invention is discussed in further detail below.

When a requested object passes through the proxy network, any proxy server 110, 111, 112 can perform a complete or partial rendering based on the associated RHI. For example, if the entire rendering process can be partitioned into two or more steps, a given one of the proxy servers (e.g., 110) may decide to perform only one of the rendering steps, and to then forward the partially rendered object to another proxy server (e.g., 111). The proxy server 110 also modifies the RHI to reflect the processing that it performed, and forwards the modified RHI as well to the proxy server 111. Furthermore, local conditions about a given one of the proxy servers 110, 111, 112, such as the CPU load and the network traffic load, can also be included in the RHI and passed along through the network 101. These aspects of the invention are discussed below in further detail.

In an exemplary embodiment of this invention the clients 130, 131 may include, for example, a personal computer (PC), a workstation, a smart phone, a personal digital assistant (PDA), etc. Proxy servers 110, 111, 112 may comprise a PC server, a RISC SYSTEM/6000 server, or a S/390 server running, for example, Internet Connection Server (ICS) available from IBM (RISC SYSTEM/6000, S/390, and Internet Connection Server are all trademarks of the International Business Machines Corporation). The network 101 may be, for example, the Internet, the World Wide Web, an Intranet and local area networks (LANs). Content servers 120, 121 may include a PC server, a RS/6000 server, or an S/390 server running Lotus Go Web server, or Lotus Domino Go server (Go Web and Domino Go are trademarks of Lotus Development Corporation).

Figure 2:
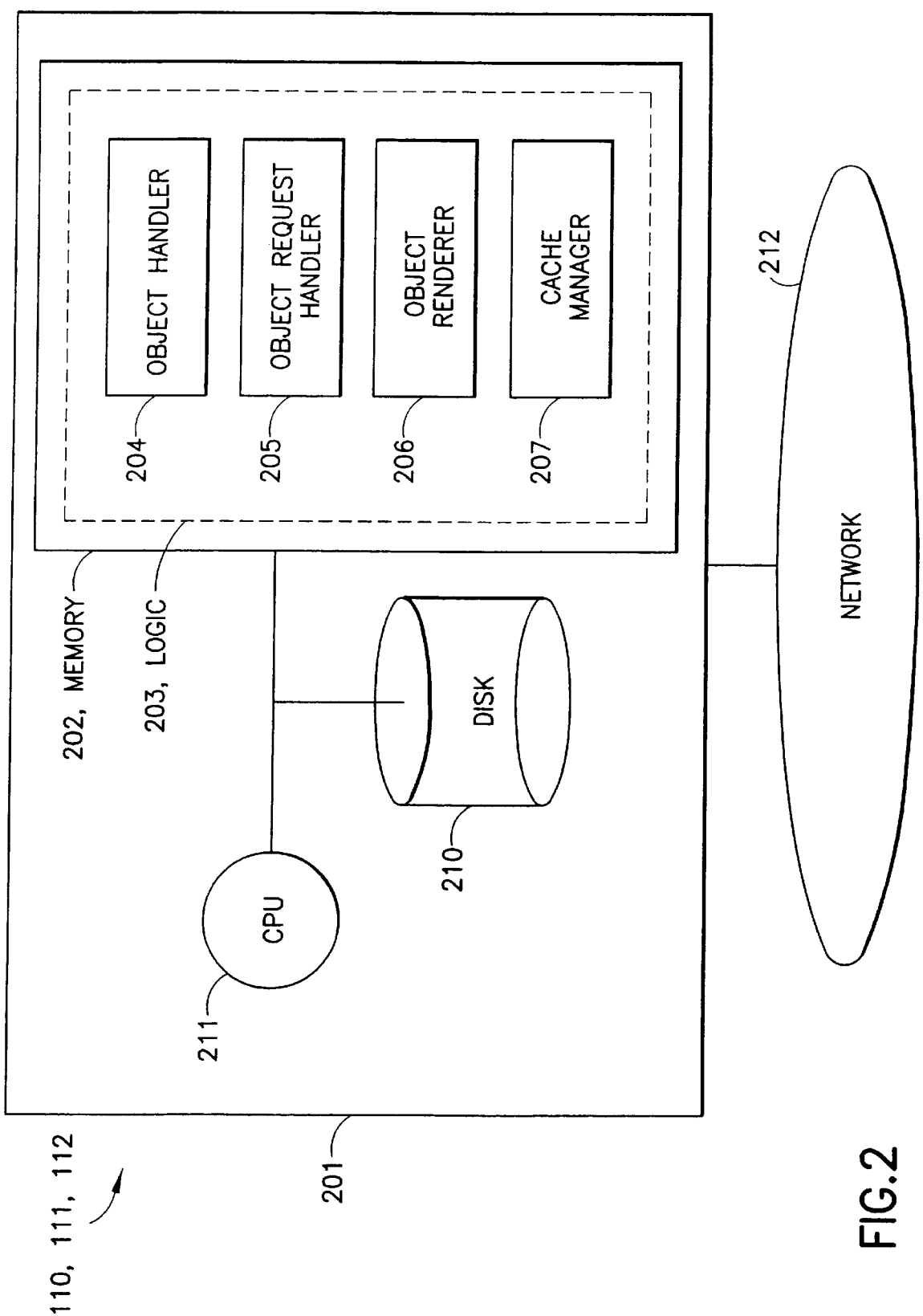
FIG. 2 is a block diagram which illustrates a proxy environment in accordance with an exemplary embodiment of the present invention.

FIG. 2 is a block diagram illustrating a general proxy environment in accordance with an exemplary embodiment of the present invention. Proxy server node 201 (which could be, by example, any one of the proxy servers 110, 111, 112 of FIG. 1) is used to represent a computing node that can service requests through a network 212, such as the network 101 of FIG. 1. Proxy server node 201 preferably includes a CPU 211, memory 202 such as RAM, and storage devices 210 such as disk storage devices or, more generally, a direct access storage device (DASD). The proxy server logic 203 may be stored within the memory 202, and is preferably embodied as computer readable and executable code which is loaded from disk 210 into memory 202 for execution by CPU 211. The proxy server logic 203, which is described in more detail with reference to FIG. 3, includes an object handler 204 (described in further detail in FIG. 5) and an object request handler 205 (described in further detail in FIG. 4). An object renderer 206, which performs object rendering according to the RHI associated with a particular object, may also be included in the proxy server logic 203. Object renderer may be a computer program which renders, by example, a color image into a black-and-white image, or one that reduces a complex HyperText Markup Language (HTML) text into a simple HTML text containing only a summary of the HTML headers. Proxy server logic 203 may also include a cache manager 207 which maintains a local copy of the partially rendered or completely rendered objects in order to avoid repeating some object rendering operations with the same proxy server.

Figure 3:
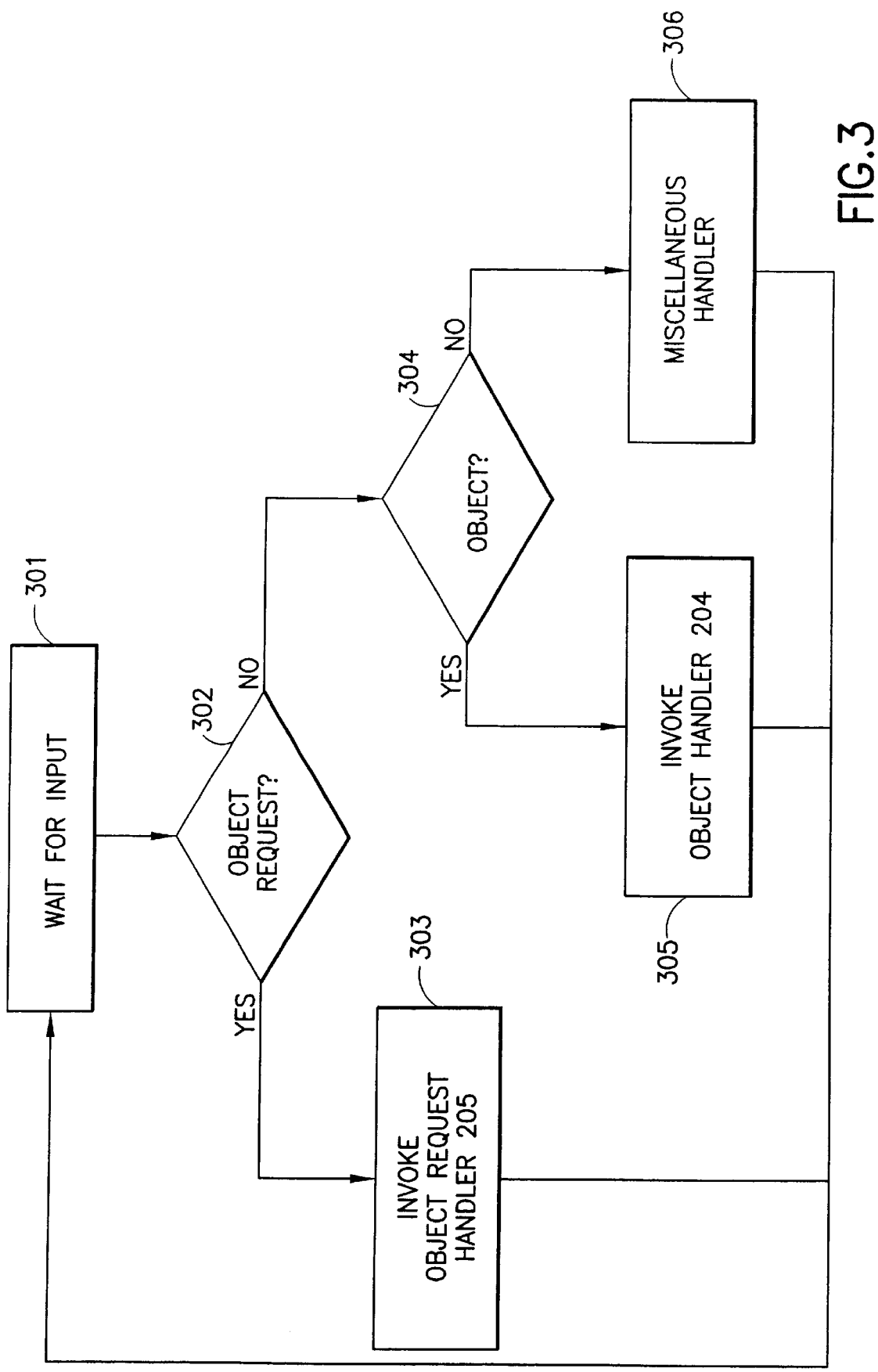
FIG. 3 is a flowchart diagram which illustrates the configuration of proxy servers in accordance with an exemplary embodiment of the present invention.

FIG. 3 is a flow chart diagram that depicts the general operations of the proxy server node 201 when it is receiving input in accordance with an exemplary embodiment of the present invention. At step 301, the proxy server node 201 waits for the input. Depending on the input received, different actions are taken. If the input received is an object request at step 302 (e.g., a HyperText Transfer Protocol (HTTP) request from a PDA-type of client 130, 131), then the object request handler 205 is invoked at step 303. The HTTP is generally used for retrieving document contents and/or descriptive header information. A detailed implementation of object request handler 205 is described in FIG. 4. If the input received is an object, step 304, (e.g. an object returned to the present proxy server node 201 in response to a request made by the proxy server node 201) the object handler 206 is invoked at step 305. A detailed implementation of the object handler 206 is described in FIG. 5. For other types of requests, such as file transfer protocol (FTP) requests, a miscellaneous handler is invoked at step 306. After invoking the appropriate handler, control returns to step 301 to wait for the next input to the proxy server node 201 from the network 212.

Figure 4:
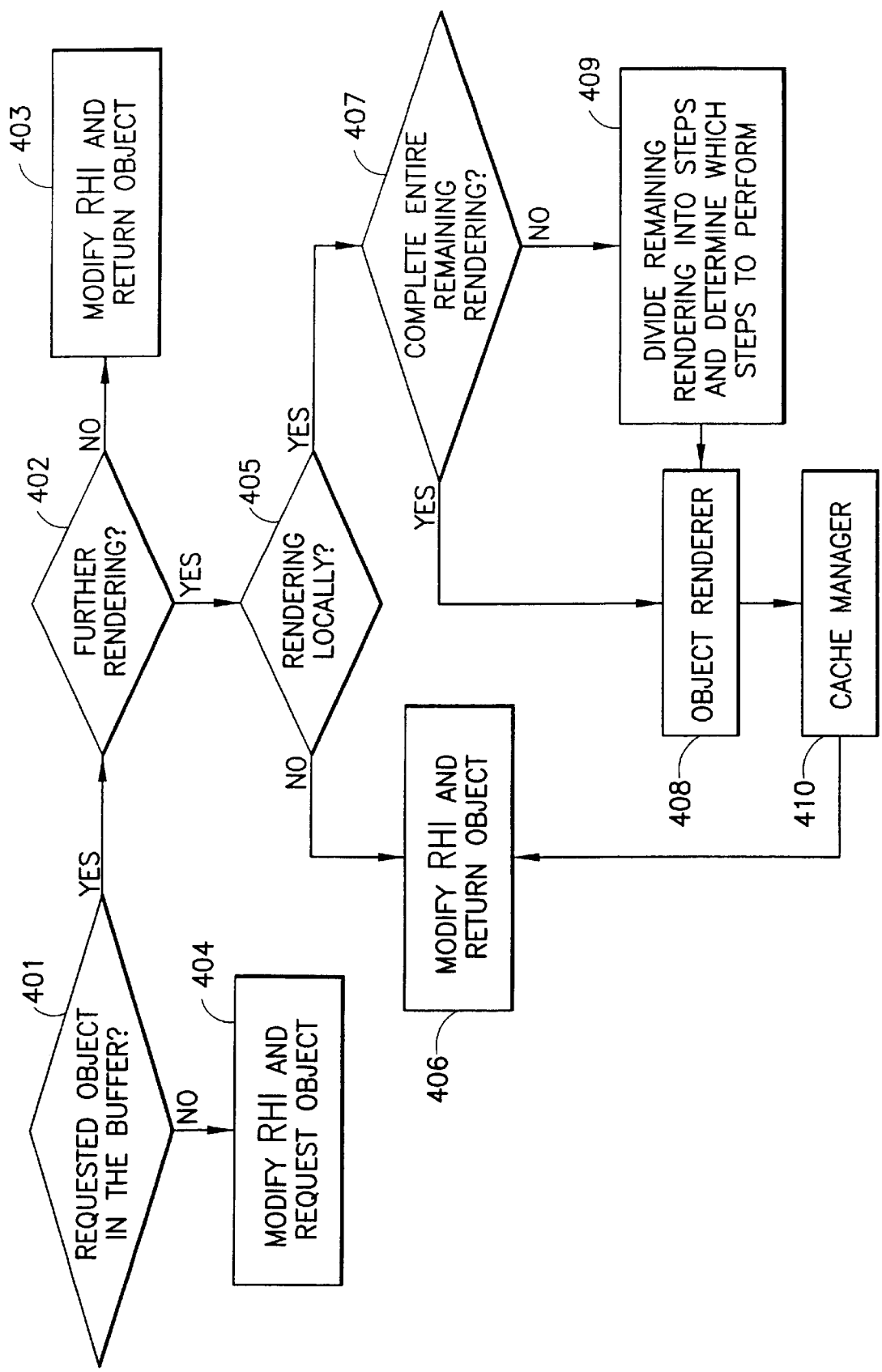
FIG. 4 is a flowchart diagram which illustrates operations of a proxy server when it receives an object request in accordance with an exemplary embodiment of the present invention.

FIG. 4 is a flow chart diagram illustrating the operations of the object request handler 205 in accordance with an exemplary embodiment of the present invention. At step 401, the object request handler 205 checks with the cache manager 207 to determine if the requested object is available in the cache. It should be noted that the cache may contain a less detailed version of the requested object, or it may contain a more detailed version. A less detailed version of the object does not satisfy the requirement and a request for the object must be sent out, typically to the appropriate one of the content servers 120, 121 or to another proxy server. However, a more detailed version of the object may be further rendered by the proxy server 110, 111, 112 in order to satisfy the request. If the requested object cannot be found in the cache, at step 404, the proxy server 110, 111, 112 modifies the associated RHI to indicate its ability for providing rendering services and then sends the request and the modified RHI to another proxy server or to the content server 120, 121, depending on the position of the proxy server in the entire proxy chain.

If a copy of the requested object can be found in the local cache, at step 402, the proxy server checks the cached object against the RHI to see if any further rendering is necessary. Note that the RHI contains the capability specification of the receiving device (i.e. the device that originally requested the object that was just found in the cache). By checking the RHI, the proxy server 110, 111, 112 can determine if any further rendering is necessary. If no further rendering is necessary, the proxy server modifies the RHI to indicate its local condition for providing rendering services and returns the object at step 403. If further rendering is found to be necessary, based on the RHI or the requesting device, then the proxy server executes at step 405 a selection function to determine whether or not it wishes to perform the rendering locally. If the proxy server decides not to perform any rendering locally, the proxy server modifies the RHI to indicate its local load condition for providing such rendering services and returns the object along with the modified RHI at step 406. If the proxy server instead decides to perform the rendering locally, it checks the RHI at step 407 to determine if it wishes to complete the entire rendering process, or just some part of the required rendering process. If the proxy server wishes to perform only a portion of the rendering process, then it executes at step 409 another selection function to determine which part of the rendering process to perform. In either case, and after making the decision to perform local rendering at step 405, the proxy server 110, 111, 112 calls the object renderer 206 to perform the object rendering at step 408. After the rendering process is complete (either a complete or partial rendering), the cache manager 207 is called at step 410 to determine whether or not to cache a copy of the rendered object locally. The proxy server 110, 111, 112 then modifies the RHI at step 406 to reflect its local condition and returns the rendered (completely rendered or partially rendered) object along with the modified RHI.

Those skilled in the art will appreciate that, at step 404, a proxy server 110, 111, 112 may indicate in the RHI that it has a less detailed version of the requested object in the cache, and then send a request for the object to another proxy server. A proxy server that has stored a more detailed version of the requested object may then decide to send the more detailed object to the requesting proxy server, or it may instead send whatever information that is needed in order for the requesting proxy server to render the object to the necessary resolution. Alternatively, the proxy server 110, 111, 112 containing the more detailed version of the requested object may decide to perform the necessary rendering for the requesting proxy server and return the completely rendered object to the requesting proxy server. This type of decision can be based on, for example, the loading of the requesting proxy server versus the loading of the proxy server that stores the more detailed version of the requested object.

Those skilled in the art will thus further appreciate that there are many different variations in the selection function for determining whether or not a given one of the proxy servers 110, 111, 112 is to perform the entire remaining rendering locally, or what part of the object rendering will be performed locally.

For example, the selection criteria may include the current CPU load and/or the network delay from the requesting node, as well as the load condition of the requesting node. The criteria may further include the type of rendering that is to be performed and the availability of the software needed to do the rendering. For example, a given one of the proxy servers 110, 111, 112 may be lightly loaded, yet lack a particular type of software that is required to render the object in a manner consistent with the display capabilities of the requesting one of the clients 130, 131. The criteria may also include the local storage availability. However, if a particular proxy server is the last one on the path to the requesting device, then it must be able to perform any remaining rendering locally.

Those skilled in the art will also appreciate that if a given one of the proxy servers 110, 111, 112 decides to perform partial rendering, it can first divide the remaining rendering operation into multiple steps and then select one or more of the steps for its own local processing. The goal is to optimize a given objective function using the associated RHI as input parameters. Moreover, a given one of the proxy servers 110, 111, 112 may also assign the remaining steps to the remaining proxy server(s) along on the path to the requesting client device 130, 131. Any proxy server receiving such an assignment plan may alter the assignment based on its own local condition (e.g., based on loading, storage, and/or the availability of the software necessary to perform its allocated portion of the assignment plan.) The objective function, which is desired to optimize, can be to reduce the greatest amount of bandwidth, to reduce the greatest amount of load imbalance among the remaining proxies on the path to the requesting device, or a combination of the two. It can also be to minimize the estimated response time from the current proxy server 110, 111, 112 to the requesting client device 130, 131, based on the RHI.

Figure 5:
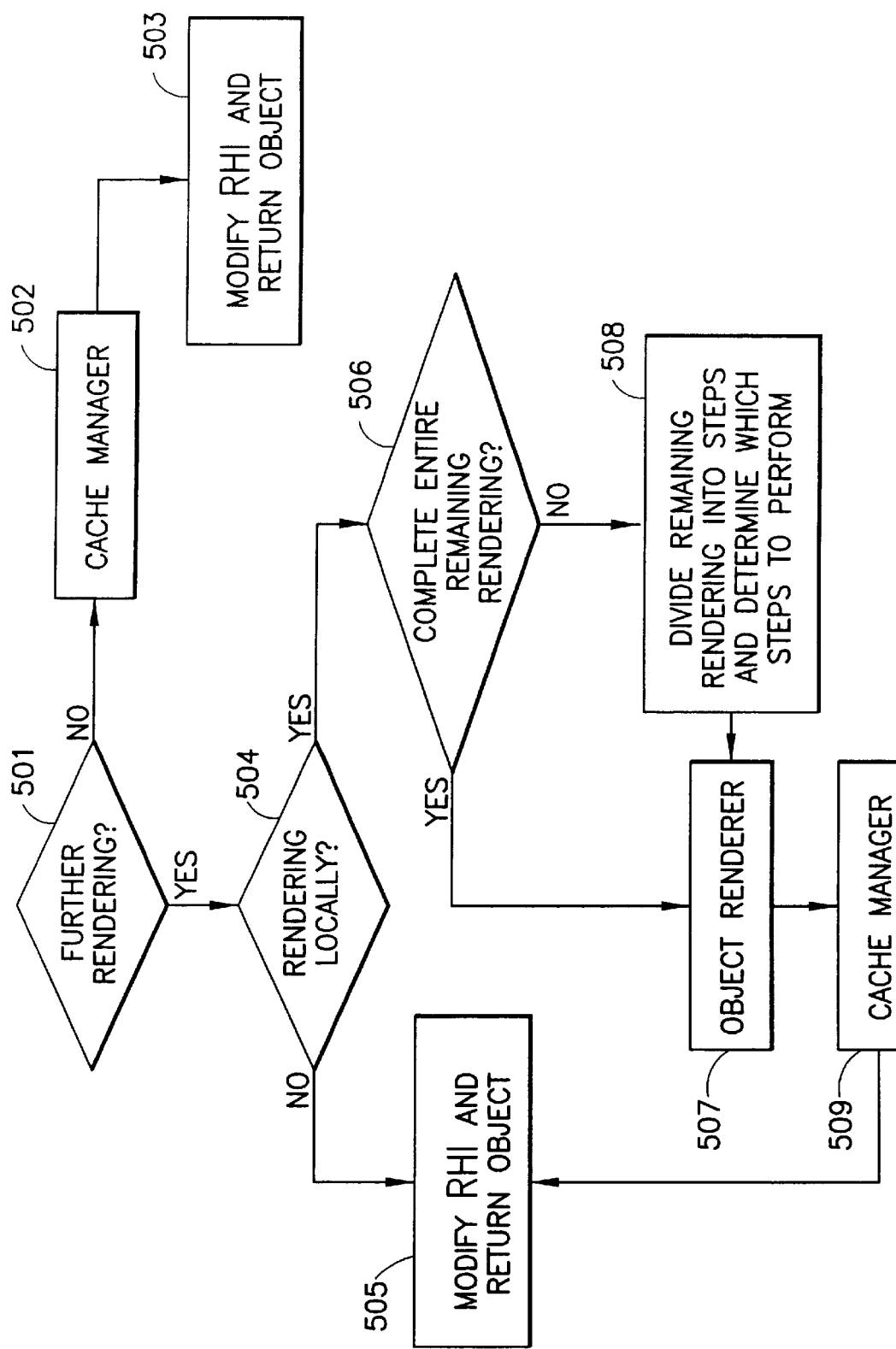
FIG. 5 is a flowchart diagram which illustrates operations of a proxy server when it receives an object in accordance with an exemplary embodiment of the present invention.

FIG. 5 is a flow chart diagram illustrating the object handler 204 of the proxy server logic 203. At step 501, when a proxy server receives an object, it first tests the associated RHI to determine if further rendering is necessary. If not, it passes the object to the cache manager 207 for caching consideration at step 502. At step 503, the received object is returned to the requesting client device 130, 131, or to another proxy server 110, 111, 112 on the path to the receiving client device. In returning the object, the proxy server may modify the associated RHI to indicate its local condition.

If the proxy server instead determines at step 501 that further rendering of the object is necessary, it determines at step 504 whether or not it will perform the rendering based on its local condition(s), such as CPU loading. If it decides not to perform the local rendering, at step 505 it modifies the RHI and then return the object to another proxy server on the path to the requesting client device 130, 131. If, on the other hand, the proxy server determines at step 504 to perform local rendering of the object, at step 506 the proxy server further determines if it will perform the entire remaining rendering process locally. If not, it may divide the remaining rendering process into multiple steps, and then select a subset of the steps to perform locally at step 508. Object renderer 206 is then called to perform the local rendering at step 507. After the rendering computations, at step 509, the cache manager 207 is called to determine if the rendered object should be cached. The proxy server 110, 111, 112 then modifies the associated RHI and returns the object either to the requesting client device 130, 131, or to another proxy server on the path to the requesting client device 130, 131.

It is possible that different intermediate proxy servers will choose different selection functions for determining the amount of object rendering to perform locally. In addition, each node in the proxy network can periodically collect load statistics from neighboring proxy server nodes, instead of including such load conditions in the RHI associated with each request.

Those skilled in the art will appreciate that the cache manager 207, in managing the cache, may take into consideration the processing cost of producing the rendered object. Therefore, the cache manager may maintain a separate stack for locally rendered objects in addition to a regular stack for other objects. It may also cache objects rendered by other proxy servers if it is beneficial to do so.

Having thus described this invention with respect to exemplary embodiments thereof, a more detailed explanation of certain aspects of this invention, in particular the presently preferred implementation for the receiver hint information (RHI), will now be provided, as will an example of the use of this invention.

In general, meta-data information can be stored in HTTP request headers and response headers, much the same way as the PICS™ ("Platform for Internet Content Selection"). Most generally, the PICS™ specification enables labels (metadata) to be associated with Internet content. PICS™ specifies a method of sending meta-information concerning electronic content, and is a Web Consortium Protocol Recommendation (see http://www.w3.org/PICS). PICS™ was first used for sending values-based rating labels for electronic content, but can also facilitate other uses for labels, such as code signing and privacy. However, the format and meaning of the meta-information is fully general. In PICS™, meta-information that is descriptive of electronic content is grouped according to a producer-and-intended-usage of the information, and within one such group, any number of categories or dimensions of information can be transmitted. Each category has a range of permitted values. For a specific piece of content, a particular category may have a single value or multiple values. In addition, the meta-information group, known as a "PICS™ label", may contain expiration information. Each PICS™ label for a specific piece of electronic content may be added or removed from the content independently.

Reference may be had to a publication entitled "PICS Label Distribution Label Syntax and Communications Protocols", REC-PICS-labels-961031, Version 1.1, W3C Recommendation 31-October-96, which is available at http://www.w3.org/PICS, and which is incorporated by reference herein in its entirety. Reference can also be had to an article entitled "Filtering Information on the Internet", Paul Resnick, Scientific American, March 1997.

In accordance with the teachings of this invention, and by example, an image file may be sent from a server with a PICS label having a field or fields set to indicate the resolution of the image. Such a resolution label can be specified by a pair of color encoding and image size, r(c 16 s 1000), where "c" and "s" are transmit names for various meta-information types, and the applicable values for this image content are 16 (for c) and 1000 (for s), indicating a 16-bit color encoding and 1000M bytes image size. Those proxy servers 110, 111, 112 that participate in the distributed object rendering are aware of how to interpret these categories and values. Other device capabilities, as well as load conditions of proxy servers, can also be similarly encoded as PICS™ labels and transmitted together with the HTTP request headers and/or response headers.

For example, the device capability of a personal digital device (PDD), such as a PDA, can be specified as a pair of color encoding and image size, d(c 1 s 2), indicating that the PDD can only display (d) an image size (s) of up to 2M bytes (two megabytes) with a 1-bit color encoding (c). This device capability PICS label can be inserted into a HTTP request header sent among different proxy servers 110, 111, 112, either by the PDD or by a proxy server coupled to the PDD, as was described above. This PICS label is referred to in the context of this invention as the receiver hint information (RHI).

It can be appreciated that a proxy server 110, 111, 112 that receives an image object having the above-noted PICS label r(c 16 s 1000), in response to a request from the PDD having the above-noted RHI d(c 1 s 2), will be informed that the PDD is incapable of displaying the image object as received, and that the image object will need to be rendered into a form that the PDD is capable of displaying. The proxy server may perform the entire rendering process, and will then modify the PICS label of the image object to be r(c 1 s 2), i.e., to indicate a format compatible with the requesting PDD's display capabilities. If, however, for some reason the proxy server elects to not completely render the image object, or to not render the image object at all, due to, for example, loading considerations or a lack of suitable software, then the PICS label of the image object will not reflect a condition compatible with the display capabilities of the PDD. For example, assume that a given one of the proxy servers 110, 111, 112 elects to only modify the color encoding of the received image object from 16 level to 1, then the modified PICS label as received by a next proxy server will be r(c 1 s 1000), which is a form still not compatible with the PDDs' RHI of d(c 1 s 2). The next proxy server 110, 111, 112 may then elect to render the received image object to reduce the image size from 1000 megabytes to 2 megabytes, resulting in the modified PICS label of r(c 1 s 2), which is a form that is compatible with the PDDs' RHI of d(c 1 s 2).

As a further example of distributed object rendering, assume that a personal digital device PDD is requesting an image file and such image file is not currently present in any of the proxy servers 110, 111, 112 in the network 101. The request is first sent to a local proxy server A, such as a local ISP (Internet Service Provider), and then forwarded to a regional proxy server B, and then to a national proxy server C. The national proxy server C then makes a request to the appropriate content server 120 or 121.

In accordance with an aspect of the teachings of this invention the local proxy server A recognizes that a HTTP request for an image file comes from a specific device PDD by recognizing the device's ID. The local proxy server A then looks up a table or directory stored in local memory or in another memory to find the device capabilities of the device PDD and the corresponding device capability PICS label, such as d(c 1 s 3), indicating this device can only display an image size of up to 3M bytes with 1-bit color encoding. Such a PICS label is then put into the HTTP request header (as the RHI for the PDD) and is subsequently sent to regional and national proxy servers B and C. In response to the request from the national proxy server C, the content server 120 or 121 prepares a resolution PICS label, r(c 16 s 100), and inserts it into the response HTTP header. The image file is then sent to the national proxy server C. After comparing the resolution PICS label against the device capability PICS (RHI) label, proxy server C determines that rendering is needed for this image file. Proxy server C then decides whether to do the rendering locally. If it is to perform the rendering locally, the national proxy server C then decides whether to complete all of the rendering itself, or to divide the rendering into multiple steps so that only some of it is performed locally. Assume that the national proxy server C determines that it will perform a partially rendering, it partially renders the image file and then updates the resolution PICS label accordingly. Next assume that the resulting resolution PICS label is sent, together with the partially rendered image file, to the regional proxy server B. Similarly, proxy server B determines if it will perform the remaining rendering locally. If not, it simply forwards the previously modified resolution PICS label, together with the partially rendered image file, to the local proxy server A. When proxy server A finally receives the image file, it determines if any remaining rendering needs to be done. If yes, it completes the rendering locally, since proxy server A is the last proxy server 110, 111, 112 in the proxy network before the PDD client device 130, 131. Proxy server A completes the rendering so that the image satisfies the device specification indicated by the PICS label d (c 1 s 3), and sends the rendered image file to the requesting PDD client device 130 or 131.

Those skilled in the art should realize that a number of possible network topologies and architectures can benefit from and operate in accordance with the teachings of this invention, and the teachings of this invention are thus not intended to be construed to be limited to only the specific exemplary embodiments that were described above.

Furthermore, the teachings of this invention are not limited to using PICS™ formatted labels or data structures for implementing the RHI.

Also, objects other than image objects can be requested, returned and also processed by one or more intermediate computing nodes. As one example, audio objects can be handled in the same or a similar manner as the above described image objects, wherein the RHI could indicate the audio playback capability of the requestor. The teachings of this invention can also be applied to complex HTML documents, containing many headers and paragraphs of text, for simplifying the documents when requested by devices, such as PDDs, having limited display capabilities.

It should also be realized that the teachings of this invention encompass a computer program embodied on a computer-readable medium (such as the disk 210) for providing individual ones of servers in a network of collaborative servers capable of performing object processing, such as image rendering, in accordance with the capabilities of a device which is to consume the object. The computer program includes a code segment, responsive to requestor-specific capability information included with a request for the object, as well as object-specific information included with the received object, for processing the object either partially or entirely for causing the object to conform to the capabilities of the requester.

The invention also encompasses a program storage device, readable by a machine, that tangibly embodies a program of instructions executable by the machine to perform method steps enabling individual ones of computing node machines in an interconnected hierarchical network of collaborative computing nodes to perform object processing, such as rendering, in accordance with the capabilities of a device which is to consume the object. The method is responsive to requestor-specific capability information that is included with a request for the object, and is further responsive to object-specific information included with the object as received from a source of the object or another computing node machine, for processing the object either partially or entirely so as to cause the object to conform to the capabilities of the requestor to consume the object.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a data network, comprising steps of:

providing a plurality of computing nodes coupled to the data network, wherein at least one computing node is a requestor of an object and generates a request, at least one computing node is a source of the requested object, and at least one computing node is an intermediate computing node that is interposed between the requestor and the source for forwarding the request to the source and for returning the requested object from the source to the requestor;

including requestor-specific capability information with a generated request for an object;

including object-specific descriptor information with the requested object; and at the at least one intermediate computing node, examining the requestor-specific capability information and the object-specific descriptor information and making a determination to process the object either entirely or partially for causing the requested object to conform either entirely or partially to the requestor-specific capability information.

2. A method as in claim 1, wherein when processing the object the method includes a step of modifying in whole or in part the object-specific descriptor information to reflect the processing performed by the at least one intermediate computing node.

3. A method as in claim 1, wherein the object is an image object, and wherein the requestor-specific capability information indicates a capability of the requestor to display the object.

4. A method as in claim 1, wherein the data network is comprised of the Internet.

5. A method as in claim 1, wherein the step of making a determination can also determine not to process the object, and wherein the step of making a determination considers at least one local condition of the intermediate computing node.

6. A method as in claim 1, wherein the intermediate computing node stores a copy of the requested object, and wherein the intermediate computing node functions as the source computing node.

7. A method as in claim 3, wherein the intermediate computing node stores a less detailed version of the requested object than the requestor-specific capability information indicates the requester is capable of displaying, and further including steps of forwarding the request to at least one other computing node, and at another computing node that has a more detailed version of the requested object, making a determination as to whether to return the more detailed version of the requested object, without local rendering, or to instead perform local rendering and return a partially rendered object, or to instead perform local rendering and return a completely rendered object.

8. A method as in claim 3, wherein the intermediate computing node stores a more detailed version of the requested object than the requestor-specific capability information indicates the requester is capable of displaying, and further comprising a step of making a determination as to whether to return the more detailed version of the requested object, without local rendering, or to instead perform local rendering and return a partially rendered object, or to instead perform local rendering and return a completely rendered object.

9. A method as in claim 3, wherein the intermediate computing node either receives or stores a more detailed version of the requested object than the requestor-specific capability information indicates the requester is capable of displaying, and further comprising a step of rendering the object in order to reduce an amount of data network bandwidth that is required to transfer the object from the intermediate computing node.

10. A method as in claim 3, wherein the intermediate computing node one of receives or stores a more detailed version of the requested object than the requestor-specific capability information indicates the requestor is capable of displaying, and further comprising a step of rendering the object in order to reduce an amount of load unbalance for any further intermediate computing nodes located between this intermediate computing node and the requestor.

11. A method as in claim 1, wherein the step of making a determination is made at least in part by considering a rendering capability of the intermediate computing node.

12. A method as in claim 1, wherein the step of making a determination is made at least in part by considering a current processing load of the intermediate computing node.

13. A method as in claim 1, wherein the step of making a determination is made at least in part by considering an amount of network delay to the requestor.

14. A method as in claim 3, wherein the intermediate computing node one of receives or stores a more detailed version of the requested object than the requestor-specific capability information indicates the requester is capable of displaying, and wherein the step of making a determination further comprises steps of dividing an amount of image object processing into a plurality of steps, and assigning at least one of the steps to at least one other intermediate computing node located between the intermediate computing node and the requester.

15. A method as in claim 14, wherein the step of assigning generates an assignment plan that is passed to the at least one other intermediate computing node over the data network.

16. A method as in claim 15, and further comprising a step of modifying the assignment plan at the at least one other intermediate computing node in accordance with a local condition.

17. A method as in claim 1, wherein the object is an image object, and wherein the object-specific descriptor information specifies at least how a color of the image object is expressed, and also a size of the image object.

18. A method as in claim 1, wherein the object is an image object, wherein the requester computing node is comprised of a display for displaying an image object, and wherein the requestor-specific capability information specifies at least a capability of the requestor to display color, as well as a maximum size of an image object that can be displayed.

19. A method as in claim 1, wherein at least the requestor-specific capability information is expressed as meta-information.

20. A method as in claim 1, wherein at least the requestor-specific capability information is expressed using a Platform for Internet Content Selection format.

21. A method as in claim 1, wherein the step of including requestor-specific capability information with a generated request for an object is performed by the requester.

22. A method as in claim 1, wherein the step of including requestor-specific capability information with a generated request for an object is performed by an intermediate computing node.

23. A method as in claim 1, wherein the step of including object-specific descriptor information with a requested object is performed by the source of the requested object.

24. A method as in claim 1, wherein the step of including object-specific descriptor information with a requested object is performed by an intermediate computing node.

25. A data network having computing nodes coupled thereto, wherein at least one computing node is a requestor of an image object and generates a request, said requestor comprising a display for displaying a requested image object, at least one computing node is a source of the requested image object, and at least one computing node is an intermediate computing node that is interposed between the requester and the source for forwarding the request to the source and for returning the requested image object from the source to the requester, wherein one of said requestor or said intermediate computing node adds requestor-specific image display capability information to a generated request for an image object, wherein one of said source or said intermediate computing node adds image object-specific descriptor information to a returned requested image object, said image object-specific descriptor information being modifiable to reflect a change made to the associated image object, and where said at least one intermediate computing node is responsive to an examination of said requestor-specific image display capability information and said object-specific descriptor information, as well as to at least one local condition, for making a determination as to whether to render the associated returned image object either completely or partially so as cause the image object-specific descriptor information of the requested image object to conform either completely or partially to the requestor-specific image display capability information, or to not render the associated image object at all.

26. A network as in claim 25, wherein said at least one intermediate computing node, after rendering the image object, modifies the associated image object-specific descriptor information to indicate a result of the rendering operation or operations performed by said at least one intermediate computing node.

27. A network as in claim 25, wherein the data network is comprised of the Internet.

28. A network as in claim 25, wherein said at least one intermediate computing node comprises a memory for storing a copy of said image object, and wherein said intermediate computing node can function as said source computing node by returning the stored copy to the requester.

29. A network as in claim 28, wherein said at least one intermediate computing node stores a less detailed version of the requested image object than the requestor-specific image display capability information indicates the requestor is capable of displaying, and where said at least one intermediate computing node forwards the request to another intermediate computing node that stores a more detailed version of the requested image object, and where said another intermediate computing node is responsive to an examination of said requestor-specific image display capability information and said object-specific descriptor information, as well as to the at least one local condition, for making a determination as to whether to render the stored image object either completely or partially so as cause the image object-specific descriptor information of the stored image object to conform either completely or partially to the requestor-specific image display capability information, or to not render the stored image object at all.

30. A network as in claim 28, wherein said at least one intermediate computing node stores a more detailed version of the requested image object than the requestor-specific image display capability information indicates the requestor is capable of displaying, and where said at least one intermediate computing node is responsive to an examination of said requestor-specific image display capability information and said object-specific descriptor information, as well as to the at least one local condition, for making a determination as to whether to render the stored image object either completely or partially so as cause the image object-specific descriptor information of the stored image object to conform either completely or partially to the requestor-specific image display capability information, or to not render the stored image object at all.

31. A network as in claim 25, wherein said at least one intermediate computing node, when rendering a requested image object that is being returned to said requestor, renders the image object in order to reduce an amount of data network bandwidth that is required to transfer the image object.

32. A network as in claim 25, wherein said at least one intermediate computing node, when rendering a requested image object that is being returned to said requester, renders the image object in order to reduce an amount of load unbalance for any further intermediate computing nodes located between said at least one intermediate computing node and said requestor.

33. A network as in claim 25, wherein said at least one local condition is comprised of at least one of a rendering capability of said intermediate computing node, a current processing load of said intermediate computing node, and an amount of network delay to the requestor.

34. A network as in claim 25, wherein said at least one intermediate computing node further divides an amount of image object rendering into a plurality of steps, and assigns at least one of the steps to at least one other intermediate computing node located between said at least one intermediate computing node and said requestor.

35. A network as in claim 34, wherein said at least one intermediate computing node derives a rendering step assignment plan that is passed to the at least one other intermediate computing node over said data network, and where said at least one other intermediate computing node can modify said assignment plan in response to at least one local condition.

36. A network as in claim 25, wherein said image object-specific descriptor information specifies at least how a color of said image object is expressed, and also a size of said image object, and wherein said requestor-specific image display capability information specifies at least a capability of said requestor to display color, as well as a maximum size of an image object that can be displayed.

37. A network as in claim 25, wherein at least said requestor-specific image display capability information is expressed as meta-information.

38. A network as in claim 25, wherein at least said requestor-specific image display capability information is expressed using a Platform for Internet Content Selection format.

39. A computer program embodied on a computer-readable medium for providing individual ones of servers in a network of collaborative servers a capability of selectively performing object processing in accordance with capabilities of a device which is to consume the object; said program comprising a code segment that is responsive to requestor-specific capability information included with a request for the object, as well as object-specific descriptor information included with a received object being returned to the requester, for selectively one of not processing the object, or processing the object either partially or entirely for causing the object to conform to the capabilities of the requestor to consume the object.

40. A program storage device, readable by a machine, that tangibly embodies a program of instructions executable by the machine to perform method steps enabling individual ones of computing node machines in an interconnected hierarchical network of collaborative computing nodes to perform object processing in accordance with capabilities of a device which is to consume the object, the method is responsive to requestor-specific capability information that is included with a request for the object, and is further responsive to object-specific descriptor information included with the object as received from a source of the object or another computing node machine, for selectively one of not processing the object, or processing the object either partially or entirely for causing the object to conform to the capabilities of the requestor to consume the object.

41. A method for operating a distributed data network, comprising the steps of:

providing a plurality of computing nodes coupled to the data network, wherein at least one computing node is a requestor of an object and generates a request, at least one computing node is a source of the requested object, and a plurality of computing nodes are intermediate computing nodes that are interposed between the requester and the source for forwarding the request to the source and for returning the requested object from the source to the requestor;

including requestor-specific capability information with a generated request for providing data for distributed, dynamic processing;

including object-specific descriptor information with the requested object for providing data for distributed, dynamic processing;

wherein each of the plurality of intermediate computer nodes is capable of determining for itself if it is capable of conforming the object either entirely or partially to the requestor-specific capability information, wherein the method provides a distributed way of conforming of the object among the plurality the intermediate computer nodes of the data network, the determining of capability comprising the steps of:

examining the requestor-specific capability information and the object-specific descriptor information, and making a determination to process the object either entirely, partially, or not at all, based on whether processing capabilities of the intermediate computer node itself correspond to at least one processing task for causing the requested object to conform either entirely or partially to the requestor-specific capability information.

* * * * *